INVENTORS:
Wilhelm Nerge and
Emil Keunecke

PATENT AGENT

Oct. 17, 1961   W. NERGE ET AL   3,004,901
APPARATUS FOR FRACTIONAL DISTILLATION
Filed Oct. 14, 1959   3 Sheets-Sheet 3

INVENTORS
Wilhelm Nerge &
Emil Keunecke
BY George H Spencer
ATTORNEY ic Office 3,004,901
Patented Oct. 17, 1961

3,004,901
APPARATUS FOR FRACTIONAL DISTILLATION
Wilhelm Nerge, Rodenkirchen, near Köln, and Emil Keunecke, Köln, Germany, assignors to Leybold-Hochvakuum-Anlagen G.m.b.H., Köln-Bayental, Germany
Filed Oct. 14, 1959, Ser. No. 846,298
Claims priority, application Germany Sept. 16, 1959
13 Claims. (Cl. 202—236)

The present invention relates to an apparatus for fractional distillation under vacuum having a rotatable, perforated insert.

It has been suggested to use a spiral insert, whereby the charged material is conveyed from the evaporator surface directly to the adjacent outer surface of the spiral insert, is then condensed thereon and passed, due to the rotation, through correspondingly formed pocket-like perforations towards the interior surface; thence the material is further vaporized on a subsequent outer surface, and so on, until, finally, the innermost condensation surface is reached. By use of this apparatus, a particularly advantageous separation in case of complex mixtures is possible and, for the first time, it was possible to separate from a single charge complex mixtures having boiling points which are close to one another.

Heretofore, it was necessary, for example, during separation of vitamins from oils, to pass such a mixture several times through the distillation apparatus. During operation of such apparatus, the condensate deposited on the insert was partially thrown off at the far edges by centrifugal action, particularly at higher velocities, and, thus, returned to the evaporation surface. Such operation has frequently proven disadvantageous, in view of the desired sharp fractionation. Since the condensate finally thrown towards the evaporation surface, due to centrifugal action of the rotating insert, represents a mixture containing also higher volatile components, these components are returned to the evaporation surface, so that the finally remaining distillation residue contains still undesired lighter volatile components. Thus, in the apparatus and method suggested heretofore, no optimum separation of the residue is obtained.

Therefore, it is an object of the present invention to obviate these difficulties by providing, in a vacuum distillation apparatus having a rotating insert, collecting means preventing return of the liquid which is on the surface of the insert to the evaporation surface. The liquid components which are not further evaporated by the insert are collected by means of these collecting means and can be discharged, if necessary, separately from the distillate and residue.

It is another object of this invention to provide a separation member between the heated evaporation surface and the interiorly arranged cooled condenser in the space between the rotatable insert and the heated evaporation surface, said separation member comprising a number of metal sheets or vanes optically tightly covering the radial passages between the cooled condensation means and the heated evaporation surface, so as to impede as little as possible the passage of the vapors from the heated evaporator surface to the rotating insert. The separation member is designed in such a manner, that no liquid can be thrown directly, due to centrifugal action, from the rotating insert through the passage openings for the vapors to the heated evaporator surface. Indeed, this liquid arrives first on the separation member and is collected there to be further distributed.

It may be advantageous to provide a stationary separation member. In certain cases, separation members having rotating inserts have proven suitable. Specifically, the rotating insert itself may be provided with suitable collecting means which prevent overflow of liquids towards the heated evaporator surface.

It is another object of the present invention to provide the insert with bent outer edges and, thereby form a collecting trough.

It is a still further object of the present invention to provide at the edge of the insert a collecting trough partially gripping over the inner and exterior sides. For this purpose, the collecting trough can be designed with a U-shaped cross section and the trough is mounted symmetrically with respect to the center line of its base, whereby the cross section and the size of the collecting trough are adapted to the individual case. In the case of high speed rotation of the insert, a higher liquid yield in the collecting trough has to be taken into account, so that larger cross sections of the trough are required. The trough may also be made smaller if the velocity of the insert is correspondingly reduced. It is possible to almost entirely prevent the liquid from being thrown off, due to centrifugal action, when extremely low velocities are used, such velocities generally being, however, not suitable.

In such distillation apparatus for vaccum distillation having a rotating insert, wiper members are suitably employed uniformly distributing the charged material over the heated evaporator surface, said material being, preferably, fed from the top. Since no condensation should take place on these wiper members, a heat-conductive connection to the heated evaporator surface is suitably provided. In the case of wiper elements made of metallic material, this can be accomplished without any special construction. In some cases, brushes or other wiper members, made of various synthetic materials, such as nylon or the material known under the trade name of "Teflon," or the like, are suitable. A superior wiper member is made in form of a brush. The wiper member wiping the heated evaporator surface may be driven by connecting said member to the rotating insert. However, if desired, it is also possible to provide a separate drive means. The wiper members can, according to the type of apparatus and the nature of the material to be distilled, be formed in several ways. The heated evaporator surface may be almost entirely or only partially covered with such wiper members, for example, brushes, rollers, or the like. Suitably, separate collecting means are provided for the condensate deposited on the cooled interior condenser, for the liquid collected on the rotating insert and, finally, for the material discharged from the heated evaporator surface. In this case, the liquid from the rotating insert can be returned entirely or partially to the feed of the distillation apparatus. Thus, in an apparatus according to the invention, three receivers, separated from one another, are provided, i.e., (1) A receiver for the condensate of the cooled condenser surface;

(2) A receiver for the liquid deposited on the rotating insert;

(3) A receiver for the discharge of the unevaporated components on the heated evaporator surface.

In this way, the sharpest separation is achieved in the product deposited on the cooled condenser surface.

As a result of the novel design, the previously known construction of such distillation apparatus is considerably improved, whereby relatively simple structural changes are necessary which can be readily carried out in the presently existing apparatus.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
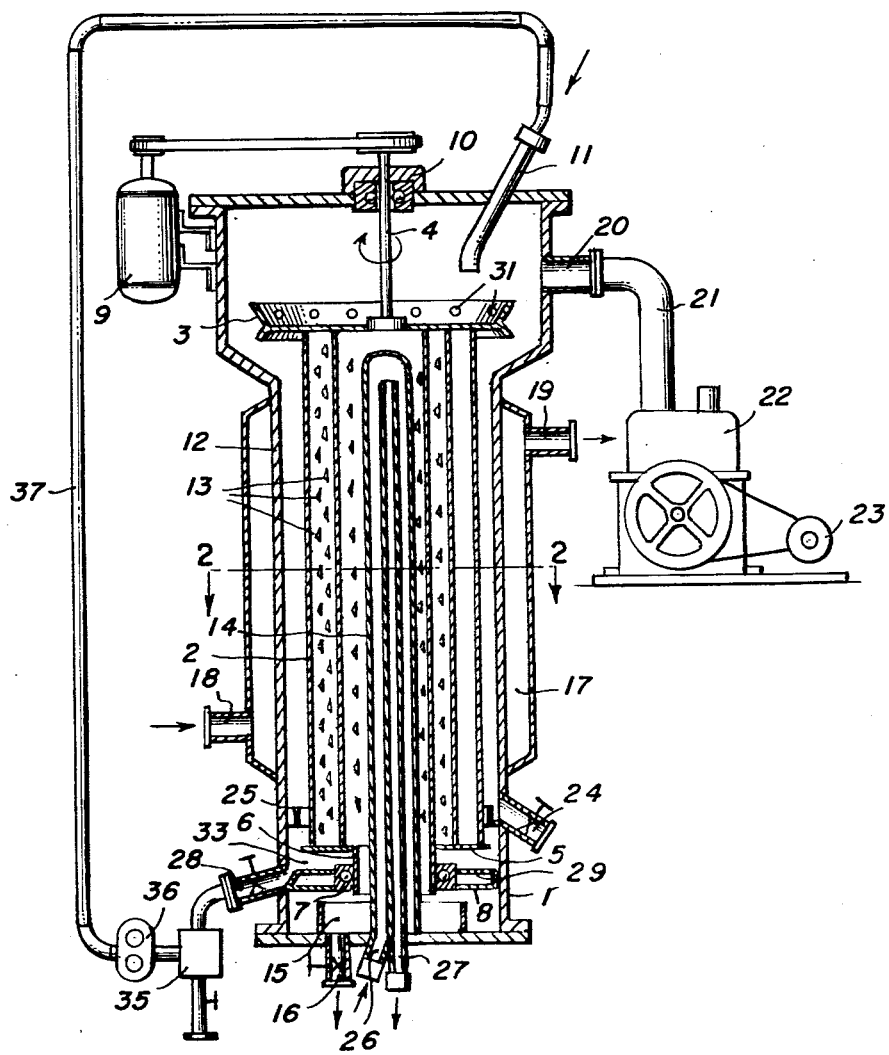
FIGURE 1 shows schematically a vertical section through an embodiment of a distillation apparatus according to the invention.

In the distillation apparatus shown in FIGURE 1, a rotating spiral insert 2 is provided inside a heated portion of a housing 1 designed as evaporator surface 12. This insert 2 is driven by means of an electric motor 9 via a drive shaft 4 designed as rotatable supporting means for a plate or disk 3, whereby said drive shaft 4 is passed vacuum-tight through a bushing 10 in the housing 1. A vacuum pump 22 is provided, i.e., connected to the interior of the housing 1, via a pipe line 21 and a flange 20 on said housing 1 to evacuate the interior thereof, whereby another electric motor 23 serves to drive said vacuum pump 22.

The evaporator surface 12 of the housing 1 is heated by providing a heating jacket 17 around it, said jacket having a flange 18 to be connected to a steam supply line (not shown) and having a steam discharge flange 19. The spiral insert 2, mounted on the plate or disk 3, has pocket-like apertures 13 permitting passage of the liquid deposited on the exterior surface to the interior surface. The lower end of the spiral insert 2 is bordered by a plate or disk 5 to which a tubular bearing member 6 is secured which is journalled in a stationary bearing 7.

The distillate is supplied via a feed nozzle 11 mounted above the evaporator surface 12, said nozzle being directed with its discharge end toward the inner surface of the disk or plate 3, the rim of which is provided with perforations 31.

A tubular condenser 14 is provided in the interior of the spiral insert 2, said condenser being connected to a circulating system for cooling water via pipes 26 and 27 and being cooled thereby.

Figure 2:
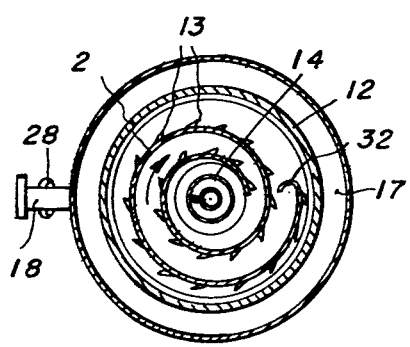
FIGURE 2 shows a cross section through a distillation apparatus according to FIGURE 1, along the line 2—2 and looking in the direction of the arrows.

The condensate deposited on the condenser 14 is collected in a receiving vessel 15 and can be discharged via an outlet 16. The liquid mixture discharging from a collecting trough 32 (see FIGURE 2) is collected in a collecting chamber 33 (FIGURE 1) and can be discharged via another outlet 28. Finally, a collecting trough 25 is provided at the lower edge of the evaporator surface 12, the discharged material from said surface collecting in said trough 25 and being discharged via the outlet 24. An intermediate container 35 is connected to the outlet 28, at least a portion of the discharged material being returned from said container to the feed nozzle 11 via a pipe 37 with the aid of a pump 36.

Figure 4:
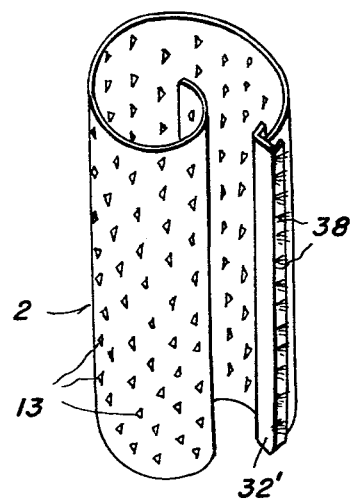
FIGURE 4 is a perspective side view of a spiral insert used in the embodiment shown in FIGURE 3.
Figure 3:
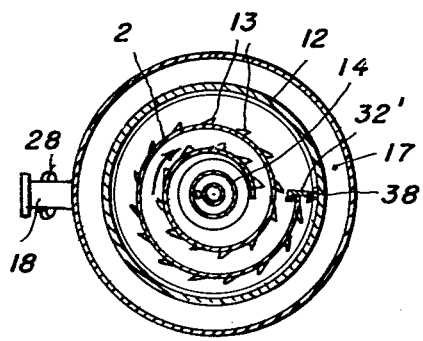
FIGURE 3 is a cross section through a modified distillation apparatus, similar to that shown in FIGURE 1, along the line 2—2 and looking in the direction of the arrows.

In the modified embodiment shown in FIGURES 3 and 4, a collecting trough 32' is provided which is U-shaped, and wiper members in form of a series of brushes 38 are mounted on the outer edge of said trough, whereby these brushes wipe on the evaporator surface 12 and, thereby, uniformly distribute the material to be distilled.

Figure 5:
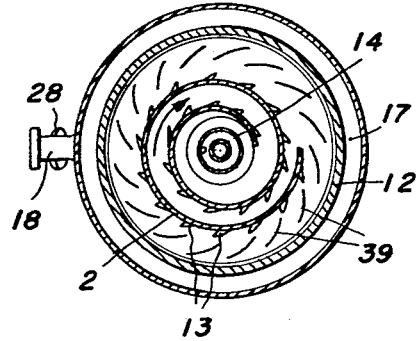
FIGURE 5 illustrates a cross section through a further modified distillation apparatus, similar to that shown in FIGURE 1, along the line 2—2 and looking in the direction of the arrows.

In the embodiment shown in FIGURE 5, stationary collecting members are provided which are located in the space between the insert 2 and the evaporator surface 12. These collecting members comprise a plurality of partially overlapping lamellar sheets or vanes 39 entirely covering the view in radial direction. The liquid thrown off from the spiral insert 2 by centrifugal action is collected by said lamellar sheets or vanes 39 and is conveyed from there to a collecting chamber which is designed analogous to the collecting chamber 33 in FIGURE 1.

During operation of a distillation apparatus according to the invention, the material to be distilled is supplied to the rotating disk or plate 3 via the supply nozzle 11, and is distributed to the upper portion of the evaporator surface 12 through the apertures 31 under centrifugal action. The series of wiper members, such as brushes 38, rotating with the insert 2 serve to uniformly distribute the material to be distilled over the entire evaporator surface.

The material to be distilled evaporates on the evaporator surface 12 and first condenses on the outer surfaces of the insert 2, then passes through the pocket like apertures 13 to the inner surfaces and is further evaporated from there to the next or adjacent outer surface, etc. Finally, a portion of the material is received on the condenser surface of the condenser 14 and is collected in the receiving vessel 15. A portion of the material which is no longer evaporating travels backwards on the spiral insert 2 in opposite direction to the rotation of the spiral to the outer edge of the latter and would be thrown back partially to the evaporator surface 12, if the rotational speed were sufficiently high. However, this is prevented by the collecting trough 32 or 32' in the embodiments shown in FIGURES 1 to 4. The non-evaporating portion of the material is collected in said collecting trough 32 or 32' on the edge of the spiral and is conveyed to the collecting chamber 33 by the action of gravity.

In the embodiment of FIGURE 5, the material which may be thrown off from the insert 2 is received on the lamellar sheets or vanes 39, from where it can be returned either entirely or partially to the supply nozzle 11. The material discharged from the evaporator surface 12 is collected in the collecting trough 25.

Figure 6:
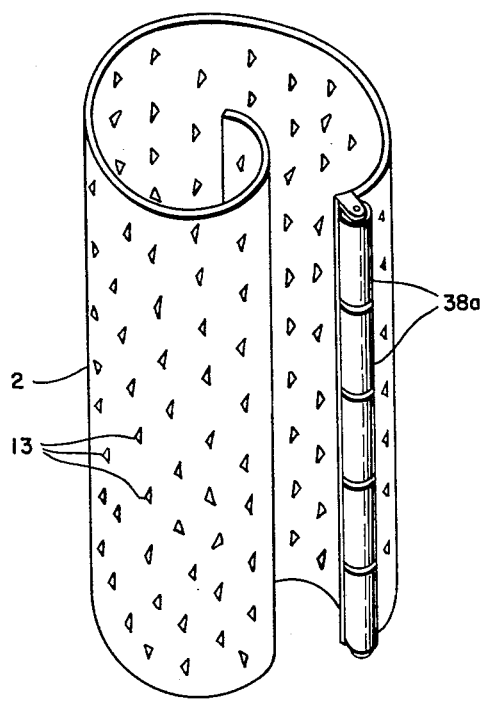
FIGURE 6 is a perspective side view of a spiral insert similar to that shown in FIGURE 4 except that a different type of wiper member is used.

FIGURE 6 shows a spiral insert 2 provided with pocket-like apertures 13, in a manner similar to that of the insert of FIGURE 4, but equipped with rollers 38a which serve as wiper members.

Figure 7:
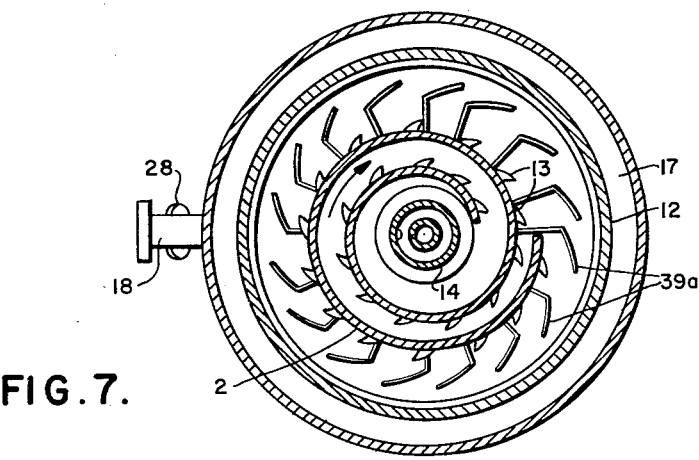
FIGURE 7 is a cross section similar to that of FIGURE 5 but showing a modified arrangement of the collecting members.

FIGURE 7 shows an arrangement similar to that of FIGURE 5, except that the lamellar vanes 39a are attached to and rotatable with the spiral insert member 2.

We claim:
1. In an apparatus for fractional distillation under vacuum, the combination which comprises: cylindrical evaporating means for evaporating the material to be distilled; condenser means located along the axis of and surrounded by said evaporating means; a rotatable perforated spiral insert member positioned between said evaporating means and said condenser means and allowing the movement of vapors between said evaporating means and said condenser means to take place in a direction substantially vertical to said axis; and collector means positioned between said spiral insert member and said evaporating means for collecting liquid condensed on the surface of said spiral insert member and flowing down said surface under the influence of gravity, thereby preventing such liquid from being centrifuged onto said evaporating means.

2. The apparatus according to claim 1, in which the spiral insert member is bent along the line of its outer edge to form a collecting trough for condensed liquid.

3. The apparatus according to claim 1, in which the spiral insert member is provided along the line of its outer edge with a collecting trough, said trough being attached to said outer edge along the center of its interior with the edges symmetrically surrounding the outer edge of said insert member.

4. The apparatus according to claim 1, in which the apparatus includes separate receivers for condensate deposited on said condenser means, for condensate deposited on said insert member, and for material discharged from said evaporating means.

5. The apparatus according to claim 1, which includes inlet means comprising a circular disk provided with a perforated rim and attached to the upper portion of said insert member.

6. The apparatus according to claim 1, in which the evaporating means comprises a hollow cylindrical jacketed vessel provided with means for introducing and removing heating fluid into said jacket.

7. The apparatus according to claim 1, in which said insert member includes wiper members attached to the outer edge thereof to distribute the material to be distilled over the surface of said evaporating means.

8. The apparatus according to claim 7, in which the wiper members are brushes.

9. The apparatus according to claim 7, in which the wiper members are rollers.

10. The apparatus according to claim 1, in which said collecting means extend parallel to said axis.

11. The apparatus according to claim 1, in which said collector means comprise a set of radially disposed lamellar vanes located between the surface of said evaporating means and said spiral insert member, said vanes forming an optically tight assembly.

12. The apparatus according to claim 11, in which the lamellar vanes are attached to and are rotatable with the spiral insert member.

13. The apparatus according to claim 11, which includes inlet means for introducing material to be distilled into the apparatus, means for returning material from said insert member to said inlet means, and means for returning material from said lamellar vanes to said inlet means.

References Cited in the file of this patent

UNITED STATES PATENTS

| | | |
|---|---|---|
| 2,180,052 | Hickman et al. | Nov. 14, 1939 |
| 2,218,240 | Hickman | Oct. 15, 1940 |
| 2,493,220 | Bibby | Jan. 3, 1950 |
| 2,500,900 | Madlen | Mar. 14, 1950 |